United States Patent [19]

New

[11] 4,396,348
[45] Aug. 2, 1983

[54] VISCOSITY PUMP

[75] Inventor: Nigel H. New, Harrow, England

[73] Assignee: AEPLC, Warwickshire, England

[21] Appl. No.: 212,732

[22] PCT Filed: Mar. 20, 1980

[86] PCT No.: PCT/GB80/00048
§ 371 Date: Nov. 5, 1980
§ 102(e) Date: Nov. 5, 1980

[87] PCT Pub. No.: WO80/02057
PCT Pub. Date: Oct. 2, 1980

[30] Foreign Application Priority Data

Mar. 27, 1979 [GB] United Kingdom ............... 7910694

[51] Int. Cl.³ .................... F01D 1/36; F04B 17/00
[52] U.S. Cl. ........................... 415/90; 415/149 A; 415/203
[58] Field of Search ............ 415/90, 114, 203, 219 C, 415/149 A; 308/122

[56] References Cited

U.S. PATENT DOCUMENTS 3,497,273 2/1970 Muijderman et al. .......... 308/122 X
3,617,148 11/1971 Endress .................... 415/90
3,794,447 2/1974 Bullough .................. 415/90 X

FOREIGN PATENT DOCUMENTS 336410 11/1921 Fed. Rep. of Germany.
720485 4/1942 Fed. Rep. of Germany.

Primary Examiner—Philip R. Coe
Assistant Examiner—Joseph M. Pitko
Attorney, Agent, or Firm—Oblon, Fisher, Spivak, McClelland & Maier

[57] ABSTRACT

A viscosity pump is provided with a pump channel having a constant cross-sectional area. The pump channel is relatively shallow and wide adjacent the inlet and outlet to promote priming of the pump. The pump channel is relatively deep and narrow intermediate the inlet and outlet in order to provide a wide load bearing surface and prevent excessive wear of the stator and rotor.

7 Claims, 2 Drawing Figures

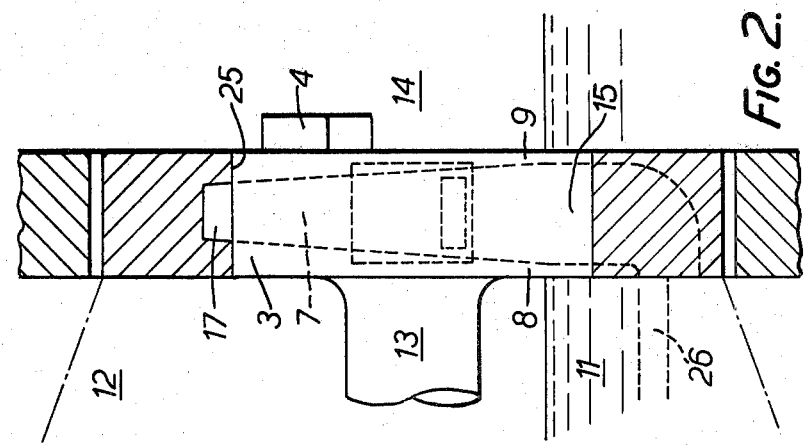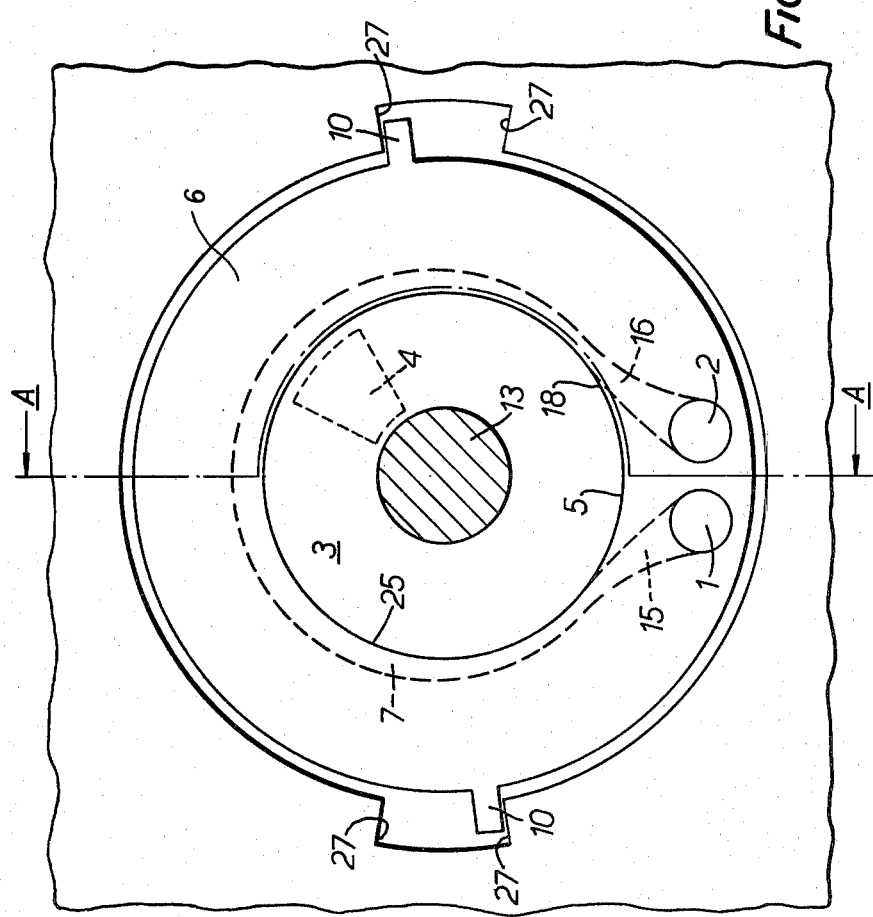
Fig. 2.
Fig. 1.

VISCOSITY PUMP

TECHNICAL FIELD

This invention relates to viscosity pumps, which comprise a rotor and stator ring, the rotor having a surface co-operating with an inner surface of the stator and being capable of rotation with respect to the stator ring, one of the surfaces having a channel for pressurising fluid between an inlet and an outlet.

BACKGROUND ART

In one known application such a pump comprises a thrust collar on a driving shaft, whose external cylindrical surface moves in close co-operation with an internal cylindrical surface of a surrounding stator ring in which the channel is formed. Viscous drag enables the rotor to pull the fluid from the channel and to pressurise it.

The collar may be a collar provided as a shaft to co-operate with thrust pads to carry shaft thrust loads. Since such pads require forced lubrication, a viscosity pump may be eminently suitable for providing that lubrication, and indeed may also provide auxiliary lubrication for the motor driving the shaft.

Difficulties with viscosity pumps are that there can be an unacceptable amount of wear between co-operating surfaces of the stator and rotor other than at the channel with consequent leakage and also that priming of the pump at starting is not easy, and wear may occur before the pump has been fully primed.

It is an object of the present invention to overcome these disadvantages.

DISCLOSURE OF INVENTION

According to the invention, a viscosity pump is characterised in that the channel has a substantially constant cross-sectional area, and is of such a shape that its width changed smoothly from being comparatively wide in the area of the inlet to being comparatively narrow in a region displaced from the inlet.

The collar conveniently constitutes a part of a thrust bearing for the driving shaft so that the pump may provide lubricant to the bearing surfaces as well as to auxiliary equipment, and also possibly to an oil cooler.

There will thus be maximum viscous forces adjacent the inlet where the channel is wide and shallow, while at a position displaced from the inlet the channel is narrower and deeper, so that it will be possible at that position to have comparatively wide lands on the stator ring on either side of the channel. This may then provide a substantial area for carrying bearing loads through the medium of a hydro-dynamic lubricant film between the co-operating surfaces.

Conveniently the depth of the channel at its deepest point may be between 1.5 and 3 times the depth at its most shallow point.

Preferably there is an area of the stator surface between the inlet and the outlet which does not have any part of the channel formed in it so that the whole of that area is available for taking bearing loads.

An inlet and/or an outlet passage may lead into the channel tangentially and may be of converging shape as it approaches the channel to act as a diffuser so that there is little turbulence where the oil enters and leaves the channel.

Where a converging passage merges tangentially into the cylindrical co-operating surface of the stator ring, a sharp edge may be formed to act as a scraper for removing oil which has been pressurised in the channel and is about to leave by way of the outlet.

The stator ring may be capable of taking up either of two positions in relation to supply and discharge lines so that the functions of the inlet and outlet apertures can be changed over if the sense of rotation of the rotor changes. Thus the pump ring could be symmetrical about a plane containing the axis of rotation.

In accordance with the invention, a thrust bearing may comprise a thrust collar on a shaft, and thrust bearing surfaces against which the collar bears during shaft rotation, so that the thrust collar may act a rotor of a pump for providing pressurised lubricant for the bearing surfaces.

BRIEF DESCRIPTION OF DRAWINGS

The invention may be carried into practice in various ways, and one embodiment will now be described by way of example, with reference to the accompanying drawings, in which FIG. 1 is an end view of a viscosity pump whose rotor is a thrust collar on a shaft; and FIG. 2 is a section on the line A—A in FIG. 1.

BEST MODE FOR CARRYING OUT THE INVENTION

In the example being described, the pump is for providing a pressurised lubricant supply from a bath indicated generally at 11 in FIG. 2, to various lubricant channels and galleries in the engine shown generally at 12, and especially to thrust pads 4 forming part of a thrust bearing for the shaft.

The pump comprises essentially a rotor constituted by a cylindrical thrust collar 3 on an extension 13 of the engine shaft, and a ring 6 within whose inner cylindrical surface 25 the collar rotates with just sufficient clearance to establish a hydro-dynamic lubricant film between the co-operating cylindrical surfaces.

The internal cylindrical surface of the ring 6 is formed with a pumping channel 7 extending around the ring between a pair of apertures 1 and 2 which are arranged to communicate with the bath 11, and with a passage 26 leading to a lubricant gallery in the engine. The collar 3 bears against a ring of thrust pads (one is shown at 4) of a conventional thrust bearing for the engine shaft. The pads 4 are mounted conventionally on a support, generally at 14, fast with the ring 6 which is itself mounted on the engine 12.

From each of the apertures 1 and 2 there is a passage formed in the body of the ring 6 which first converges as indicated at 15, and then opens smoothly tangentially into the annular channel 7. The channel 7 is of constant cross sectional area, but where it joins the passages 15, it is shallow and wide as indicated at 16, and at the mid-way position diametrically opposite the apertures 1 and 2 is narrow and deep as indicated at 17.

As the collar 3 is driven around, the lubricant at 15 (assuming rotation is clockwise in FIG. 1), is driven viscously around with the rotating cylindrical surface of the collar, and an increased pressure is established by the time the lubricant reaches the passage leading to the aperture 2, where it is scraped from the surface of the collar 3 by the edge 18 of a land extending between the openings from the passages leading to the apertures 1 and 2. Between the two edges 18 is an uninterrupted area 5.

The smooth change in the cross sectional shape (but not the area) of the channel 7 ensures that there is maximum viscous drag near the apertures 1 and 2, where the channel section is wide and shallow, whereas there is the maximum load bearing area on the lands 8 and 9 on either side of the channel at the region 17 opposite 5 where substantial loads have to be carried. Where the channel is wide to give high viscous drag, so that the lands 8 and 9 are quite narrow, there is the adjacent substantial area 5 which is uninterrupted by the channel 7 for supporting substantial loads there.

Where the collar 3 can only rotate in one sense, the ring 6 would be fixed to the engine, but if it were possible for the collar 3 to be rotated in either sense, then the ring 6 could be mounted for limited rotation about the shaft axis between two positions defined on each side by an external lug 10 on the ring, and a pair of stop surfaces 27 on the engine in which respective positions the bath 11 and the passage 26 would be in communication with different ones of the apertures 1 and 2. Rotation of the collar 3 and the viscous drag of the lubricant would hold the ring 6 against one or other of the stop surfaces 27 on each side, and reversal of the direction of rotation would automatically move the ring against the other stop surfaces.

In many cases, it is convenient if the depth of the channel 7 at 17 is between 1.5 and 3 times the depth of the channel at 16. The arcuate extent of the area 5 may be between about 5° and about 30°.

The smooth reduction in cross sectional area of the diffuser passages 15 helps to ensure that a minimum of turbulence occurs in those areas with acceleration and deceleration of the lubricant occuring smoothly, and that gives the pump a high efficiency, and also enables it to be primed quickly and easily so that there is unlikely to be wear at starting up before a lubricant film is established.

It may be noted that this is achieved while having a substantial load supporting land area on either side of the channel 7 at the region 17, and that may be conveniently about one third or one half of the width of the ring 6.

Often, a rotating shaft will have angular positions of maximum transverse load, for example the vertical directions for heavy shafts or for shafts carrying heavy loads, or the direction of piston movement in the case of a shaft driven by a reciprocating engine. The pump ring will be oriented so that the larger bearing area at 17 and 5 are where the maximum loads are experienced.

The bath 11 is arranged so that the lowest part of the collar will be under oil in the bath when the collar is stationary. Thus, at starting, there will be oil on the area 5 to provide lubrication before pumping pressure has been built up.

It will be seen that the thrust bearing collar is used to provide pressurised lubricant for the thrust pads, and can also be used for other auxiliary purposes.

The main load driven by the shaft might be turbine or a main pump, for example, for pumping oil from the sea bed.

I claim:

1. A viscosity pump comprising a rotor and a stator ring, said stator ring having an inner cylindrical surface and said rotor having a surface co-operating with said inner surface of said stator ring and being capable of rotation with respect to said stator ring, one of said rotor surface and said stator ring inner surface having a channel, said channel being in communication with an inlet and an outlet whereby fluid is pressurized between said inlet and said outlet upon relative rotation between said rotor and said stator ring, said channel being of such a shape that its width changes smoothly from a first value in a region adjacent said inlet to a second value smaller than said first value in a region displaced from said inlet, the depth of said channel changing smoothly from a first value in a region adjacent said inlet to a second value larger than said first value in said region displaced from said inlet, wherein said first and second values of said width and depth are selected such that said channel has a substantially constant cross-sectional area.

2. A pump according to claim 1 wherein said channel is in said inner surface of said stator.

3. A pump according to claim 2 including an area comprising part of the circumferential extent of the inner cylindrical surface of the stator, said area having no part of said channel formed in it and being located generally between said inlet and said outlet, wherein an arcuate extent of said area is between 5° and 30°.

4. A pump according to claim 3 further including a first passage extending between said inlet and said channel and a second passage extending between said outlet and said channel, said passages meet said channel tangentially to said rotor.

5. A pump according to claim 4 including a sharp edge across said inner surface of said stator ring where said second passage from said outlet meets said channel tangentially.

6. A pump according to claim 5 wherein said second value of the depth of said channel is between 1.5 and 3 times said first value of the depth of said channel.

7. A pump according to claim 6 wherein said stator ring is mounted for taking up either of two rotational positions depending upon the direction of rotation of said rotor, whereby the functions of said inlet and said outlet are reversed when the direction of rotation of said rotor is reversed.

* * * * *